US011119827B2

(12) United States Patent
Anderson et al.

(10) Patent No.: US 11,119,827 B2
(45) Date of Patent: *Sep. 14, 2021

(54) LOAD BALANCING DETERMINISTICALLY-SUBSETTED PROCESSING RESOURCES USING FRACTIONAL LOADS

(71) Applicant: Twitter, Inc., San Francisco, CA (US)

(72) Inventors: Bryce Anderson, San Francisco, CA (US); Daniel Furse, San Francisco, CA (US); Eugene Ma, San Francisco, CA (US); Ruben Oanta, San Francisco, CA (US)

(73) Assignee: TWITTER, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,292

(22) Filed: Jan. 29, 2020

(65) Prior Publication Data

US 2020/0167198 A1   May 28, 2020

Related U.S. Application Data

(63) Continuation of application No. 16/101,748, filed on Aug. 13, 2018, now Pat. No. 10,579,432.

(51) Int. Cl.
*G06F 9/50* (2006.01)
*H04L 29/08* (2006.01)
*H04L 12/803* (2013.01)

(52) U.S. Cl.
CPC ............ *G06F 9/505* (2013.01); *G06F 9/5027* (2013.01); *G06F 9/5077* (2013.01);
(Continued)

(58) Field of Classification Search
CPC ...... G06F 9/505; G06F 9/5077; G06F 9/5083; G06F 9/5027; H04L 67/1008;
(Continued)

(56) References Cited

U.S. PATENT DOCUMENTS 6,119,143 A * 9/2000 Dias ........................ G06F 9/505
709/201
6,314,465 B1   11/2001 Paul et al.
(Continued)

OTHER PUBLICATIONS

Alejandro Forero Cuervo, "Load Balancing in the Datacenter", O'Reilly's Site Reliability Engineering: How Google Runs Production Systems, Chapter 20, First Edition, Apr. 2016, pp. 235-240.
(Continued)

*Primary Examiner* — Michael Won
(74) *Attorney, Agent, or Firm* — Nixon & Vanderhye, P.C.

(57) ABSTRACT

Systems and methods are described for load balancing between a set of servers. Subsets of servers from the set of servers are assigned, via deterministic subsetting, to respective clients from a set of clients. Unlike conventional load balancing techniques using deterministic subsetting, the disclosed techniques enable configuring a client to distribute different amounts of load among the servers in its server subset. Techniques for constructing the subsets are also described.

19 Claims, 8 Drawing Sheets

(52) U.S. Cl.
CPC ...... *G06F 9/5083* (2013.01); *H04L 29/08144* (2013.01); *H04L 29/08153* (2013.01); *H04L 29/08243* (2013.01); *H04L 29/08252* (2013.01); *H04L 47/125* (2013.01); *H04L 67/1002* (2013.01); *H04L 67/1004* (2013.01); *H04L 67/1008* (2013.01); *H04L 67/1029* (2013.01)

(58) Field of Classification Search
CPC ............. H04L 67/1029; H04L 67/1004; H04L 29/08252; H04L 67/1002; H04L 29/08144; H04L 29/08243; H04L 47/125; H04L 29/08153; H04L 67/1031; H04L 67/02
See application file for complete search history.

(56) References Cited

U.S. PATENT DOCUMENTS

| | | | |
|---|---|---|---|
| 6,578,066 B1 | 6/2003 | Login | |
| 6,910,221 B1* | 6/2005 | Honda | H04H 20/12 725/116 |
| 9,116,752 B1 | 8/2015 | Petit-Huguenin et al. | |
| 9,232,000 B1* | 1/2016 | Pittman | H04L 45/22 |
| 10,530,700 B2* | 1/2020 | Ho | H04L 47/127 |
| 10,757,176 B1* | 8/2020 | Petit-Huguenin | G06F 9/505 |
| 2002/0032777 A1* | 3/2002 | Kawata | H04L 67/1008 709/226 |
| 2002/0116479 A1* | 8/2002 | Ishida | H04L 67/1008 709/220 |
| 2003/0028642 A1* | 2/2003 | Agarwal | H04L 67/20 709/226 |
| 2004/0088408 A1* | 5/2004 | Tsyganskiy | H04L 63/1408 709/225 |
| 2007/0143460 A1* | 6/2007 | Ben-David | H04L 67/1008 709/223 |
| 2007/0162584 A1* | 7/2007 | Kokusho | G06F 9/5083 709/223 |
| 2007/0206618 A1 | 9/2007 | Zelig et al. | |
| 2008/0008095 A1* | 1/2008 | Gilfix | H04L 47/10 370/235 |
| 2008/0225710 A1* | 9/2008 | Raja | H04L 67/1029 370/230.1 |
| 2008/0225718 A1* | 9/2008 | Raja | H04L 67/1029 370/235 |
| 2009/0023455 A1* | 1/2009 | Gupta | H04L 67/101 455/453 |
| 2009/0125625 A1* | 5/2009 | Shim | H04L 67/1008 709/226 |
| 2009/0241176 A1* | 9/2009 | Beletski | G06F 9/505 726/7 |
| 2009/0271515 A1* | 10/2009 | Iyengar | H04L 65/1006 709/226 |
| 2011/0225298 A1* | 9/2011 | Brown | G06F 9/505 709/226 |
| 2011/0276695 A1* | 11/2011 | Maldaner | H04L 41/00 709/226 |
| 2012/0030341 A1* | 2/2012 | Jensen | H04L 67/2804 709/224 |
| 2013/0031562 A1* | 1/2013 | Gusak | G06F 9/505 718/105 |
| 2014/0067914 A1* | 3/2014 | Nishii | G06F 9/45558 709/203 |
| 2014/0330976 A1* | 11/2014 | van Bemmel | H04L 69/16 709/226 |
| 2015/0039766 A1 | 2/2015 | Bachar et al. | |
| 2015/0295853 A1* | 10/2015 | Pell | G06F 9/5077 709/226 |
| 2016/0065660 A1* | 3/2016 | Miyata | H04L 67/1029 709/223 |
| 2017/0149878 A1* | 5/2017 | Mutnuru | H04L 67/1023 |
| 2017/0214738 A1 | 7/2017 | Agarwal et al. | |
| 2017/0346886 A1* | 11/2017 | Hikichi | G06F 9/5083 |
| 2018/0024766 A1* | 1/2018 | Agetsuma | G06F 11/34 711/154 |
| 2019/0044831 A1* | 2/2019 | Guim Bernat | H04L 41/5019 |
| 2019/0116217 A1* | 4/2019 | Dhanabalan | H04L 43/0835 |
| 2019/0124142 A1* | 4/2019 | Bartolome Rodrigo | H04L 67/1008 |
| 2019/0303757 A1* | 10/2019 | Wang | G06F 9/5027 |

OTHER PUBLICATIONS

Vahab Mirrokni, Mikkel Thorup and Morteza Zadimoghaddam, "Consistent Hashing with Bounded Loads", NYC Algorithms Team, Google AI Blog, Apr. 3, 2017 (https://research.googleblog.com/2017/04/consistent-hashing-with-bounded-loads.html) (7 pages).

Vahab Mirrokni, Mikkel Thorup, and Morteza Zadimoghaddam, "Consistent Hashing with Bounded Loads", Jul. 28, 2017 (https://arxiv.org/pdf/1608.01350.pdf) (37 pages).

* cited by examiner

LOAD BALANCING DETERMINISTICALLY-SUBSETTED PROCESSING RESOURCES USING FRACTIONAL LOADS

CROSS SECTION TO RELATED APPLICATION

This application is a continuation of application Ser. No. 16/101,748, filed on Aug. 13, 2018. The entire contents of the application are incorporated herein by reference.

FIELD OF THE DISCLOSURE

This disclosure relates generally to balancing load across a collection of processing resources, and more particularly to techniques for distributing substantially equal amounts of load across a collection of deterministically-subsetted processing resources.

BACKGROUND

A load balancer distributes load across a collection of processing resources, such as, for example, computers configured to perform computing tasks such as data processing tasks, communication/networking tasks and/or data storage tasks. Example loads processed by the processing resources may include service requests (also referred to as "processing requests") for causing one or more computing tasks to be performed by a processing resource. These service requests can include, by way of example and without limitation, requests to write data (e.g., a social media post, write to storage), requests to read data (e.g., accessing a social media post, requesting a timeline from a social media service, read from storage), search requests, compute requests, data download/upload requests, data display requests and the like. In some example embodiments, the "load" may include a volume of data from/to storage and/or volume of network traffic.

Load balancing is an important consideration in any processing system, and helps ensure the performance, scalability, and resilience of high transaction volume processing systems that have multiple processing resources. When processing of service requests can be distributed over multiple servers in a system, a load balancer may operate to control the distribution of the service requests across the multiple servers in order to reduce latency and/or increase the proportion of successfully serviced requests.

The various types of processing resources to which the load is distributed are sometimes collectively referred to as "servers" in this disclosure. Various techniques and algorithms have been proposed for load balancing among a set of servers. These techniques include, for example, round robin load balancing, and least loaded load balancing.

However, when a set of clients use these conventional load distribution techniques to distribute load to a plurality of servers that perform computing tasks in response to the received load, the overhead for establishing and maintaining connections between each of the clients and the set of servers can be high.

"Deterministic subletting" enables each client to, be configured to maintain connections to only a subset (also referred to as an "aperture") of the servers to which it sends load such as service requests. With deterministic subletting ("deterministic aperture") load balancing, a client is not required to establish connections with every server in a large set of servers that services a particular type of service request, and instead is only required to send its load over a smaller number of servers corresponding to the subset of servers with which the client establishes connections.

SUMMARY OF EXAMPLE EMBODIMENTS

Example embodiments disclosed herein are related to improved deterministic aperture load balancing techniques for balancing load from a set of clients among a set of servers. These improved load balancing techniques enable each client to distribute load to only a subset (or an "aperture") of the servers, and/or allow at least one client to distribute a fractional load to some of the servers to which it is connected such that each server of the set of servers receives substantially the same amount of load.

By maintaining connections and distributing load to only a subset of servers assigned to a client, the improved techniques reduce the overhead involved in balancing load among a set of servers. Moreover, allowing a client to distribute a fractional load to at least one server enables more even distribution of load among the servers. These improved characteristics not only improve the computing performance and/or utilization of processing resources of the clients and the servers, but also enable the clients to reduce latency and increase success rate associated with distributed service requests.

According to one embodiment, there is provided a load balancing method for balancing a processing load of a plurality of clients among a plurality of servers. The method comprises assigning a different subset of the plurality of servers to each respective client in the plurality of clients. Each client is configured to distribute processing requests only to servers in the subset assigned thereto. The load balancing method further includes, for each respective client in the plurality of clients, determining respective load weights for distributing processing requests to the servers in the subset assigned thereto. The load weights for each respective client are determined such that each server of the plurality of servers processes substantially the same unit amount of processing requests and such that at least one server of the plurality of servers is assigned to multiple clients in the plurality of clients. At least one of the load weights for each respective client is a fraction of another one of the load weights for the client. The load-balancing method may also include controlling the plurality of clients to distribute processing requests based on the determined load weights.

Another example embodiment provides a load balancing computer processing system including a plurality of clients. Each respective client includes communication circuitry and a processor. The processor is configured to control the communication circuitry of the respective client to distribute processing requests to a respective subset of a plurality of servers over a communication network by transmitting a first weighted-quantity of the processing requests to each of one or more of the servers in the respective subset and transmitting to at least one other server in the respective subset a second weighted-quantity of the processing requests. The second weighted-quantity is a fraction of the first weighted-quantity such that the respective client is configured to distribute a same volume of processing requests as other clients in the plurality of clients and such that at least one server of the plurality of servers is assigned to multiple clients.

Another embodiment provides a non-transitory computer readable storage medium storing computer program instructions that, when executed by a processor of a client, causes the client to balance load distributed among a plurality of servers. The computer program instructions include instructions for determining a total number of the plurality servers as a server set size, a total number of a plurality clients as a client set size, a unique identifier assigned to the client, and a subset size for the client. The subset size is the total number of servers to be connected with the client. The instructions further include, based upon the determined server set size, client set size, subset size, and identifier assigned to the client, determining a subset of servers from the plurality of servers and relative load weights for servers in the selected subset, so that a same volume of processing requests is distributed to the plurality of servers by the client as other clients in the plurality of clients.

In these example embodiments, each of the relative load weights indicates relative amounts of processing requests transmitted from the client to respective server in the subset. The selected subset, which has a size of at least the determined subset size and of a same size as respective subsets of selected by each other client in the plurality of clients. At least one of the relative load weights for one server in the selected subset is a fraction of another of the relative load weights for another server in the selected subset.

The present disclosure uses the phrases substantially the same amount of load, or substantially equal amounts of load, to indicate that the amounts of load distributed to the servers may be the same, or very nearly the same (e.g., varying only by a relatively small margin, such as, any of, 5%, 2%, 1% etc.), across the servers in a server subset. For example, in some embodiments, although the clients are programmatically configured to distribute the same amount of load to respective servers in a subset of servers, network conditions and/or processing request availability may result in some of the servers receiving a marginally lower amount of work than the other servers in the subset.

The example embodiments, aspects, and advantages disclosed herein may be provided in any suitable combination or sub-combination to achieve yet further example embodiments.

BRIEF DESCRIPTION OF THE DRAWINGS

The accompanying drawings facilitate an understanding of example embodiments of this invention. In the drawings.

DETAILED DESCRIPTION OF EXAMPLE EMBODIMENTS

Figure 1:
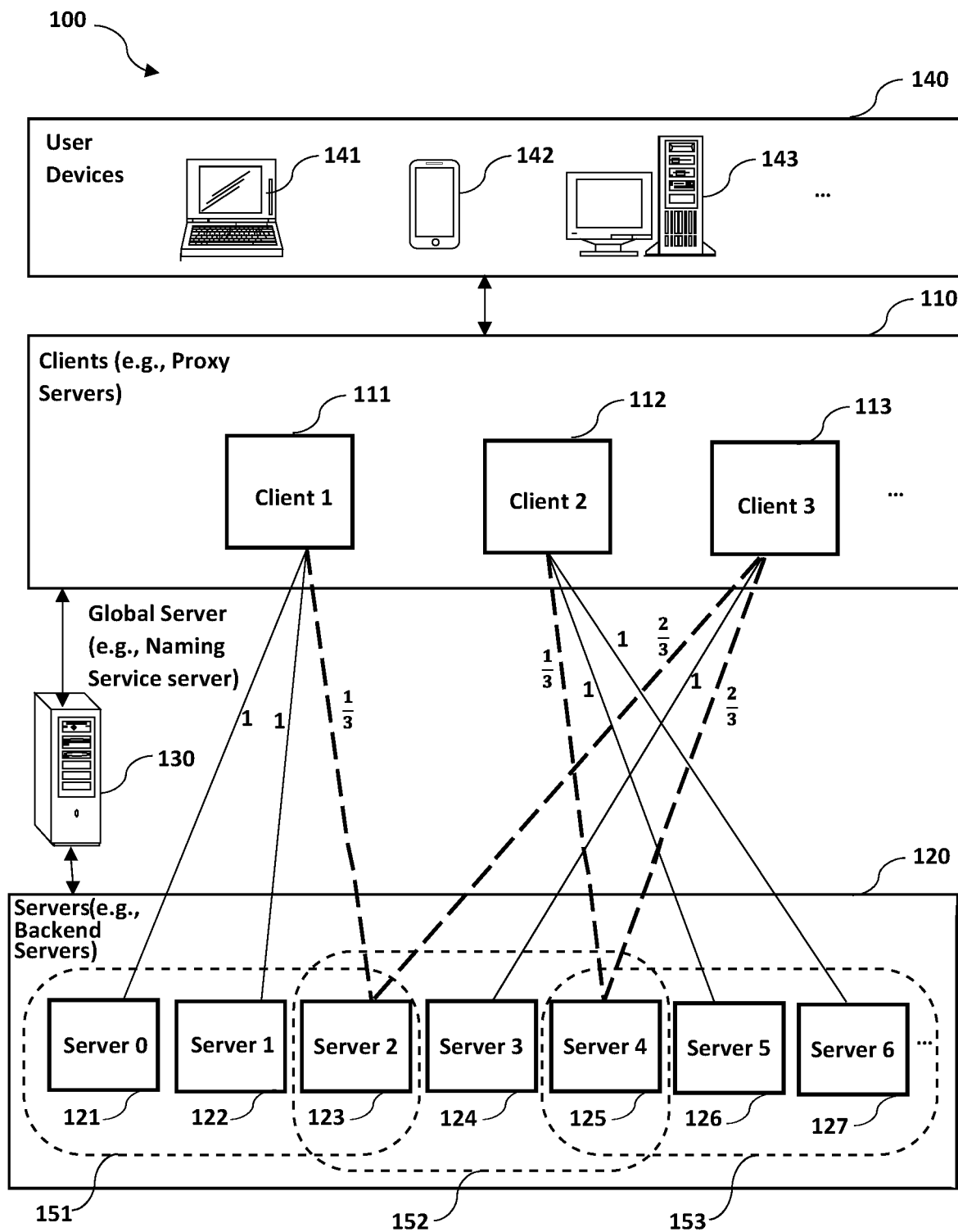
FIG. 1 illustrates a non-limiting, example system architecture of an example system supporting balancing load from a set of clients across a set of servers.

In accordance with certain example embodiments, certain systems, devices, processes, and methods are disclosed for balancing load across a collection of processing resources. More particularly, certain example embodiments relate to techniques for distributing substantially equal amounts of load across a plurality of deterministically subsetted servers. In the following description, for purposes of explanation, numerous specific details are set forth to provide a thorough understanding of example embodiments.

As described above, with the use of deterministic subsetting, each client in a set of clients may distribute load to only a subset (or an "aperture") of the set of servers. Subsetting therefore enables a client to use processing resources sufficient to service its load, and to less frequently incur penalties for connection establishment. Avoiding a large number of connections can result in reduced overhead, and may also result in enhanced functionality of circuit breaker logic and the like because their function may be more effective with the increased traffic from a smaller subset of servers.

The deterministic subsetting of the plurality of servers as used in example embodiments is different from random subsetting of servers used by some conventional load balancing systems. Random subsetting may result in a load imbalance, e.g., some servers may be picked more frequently than the others due to inherent probabilities associated with selecting a server randomly. The random selection of servers for each client's subset may result in a load distribution that closely resembles a binomial distribution. For example, when two clients transmit service requests to two servers, and each client only randomly picks one of the servers for its service requests, there is a 50% probability of each server getting an equal amount of load, a 25% chance of one server getting all the load and a 25% chance of the other server getting all the load from the two clients. This phenomenon, in which the load is unevenly distributed among the set of servers, is known as "load banding" or "banding." Reducing or minimizing load banding in random subsetting may require tuning each client's connections over which service requests are transmitted to servers to achieve a more even distribution.

Deterministic subsetting (also referred to as "fixed-size subsetting") which is used in example embodiments is an enhanced server subset selection method used to mitigate the load banding problem while reducing or minimizing the number of connections. In deterministic subsetting, each client is aware of the set of its peer clients, and deterministically selects a fixed number of servers with which to connect. In deterministic subsetting, a set of clients can distribute its service requests across a set of servers without having established a large number of connections to servers. This technique can reduce the load banding associated with random subsetting in many configurations, and hence reduces or eliminates the need for tuning connections for each client to reduce load banding. Reduced load banding improves utilization of processing resources by distributing loads more evenly.

However, deterministic subsetting can still result in a particular kind of load banding problem (e.g., off-by-one errors) if, for example, the number of clients multiplied by the number of connections each client requires is not a multiple of the number of servers in the set of servers. For example, if two clients need to transmit service requests to a set of seven servers, and each client needs to establish connections with four of the servers, then at least one of the seven servers may receive requests from two clients while the other servers may only receive requests from one client. In this example, if each server receives the same amount of load from each client it connects with, the load would not be evenly distributed among these servers.

Certain example embodiments described herein introduce "fractional load" to load balancers that use deterministic subsetting. A "unit load" is the maximum load any particular client in the set of clients is configured to transmit to any particular server in its subset. Fractional load capability enables a client to transmit a "unit load" amount of service requests to some servers in its server subset and fractional amounts of a unit load to the other servers in its server subset. In contrast, in conventional deterministic subsetting techniques, each client is configured to distribute its load, of service requests equally among the servers in its server subset. In other example embodiments, at least one client is configured to send one or more fractional amounts of a unit load to one or more servers in its server subset, while another client is configured to send one full amount of a unit load to a server in its server subset.

Moreover, whereas in conventional deterministic subsetting each server receives a same amount of load (e.g., a unit load) from one or more clients, according to example embodiments described herein, a server may receive different amounts of load from respective clients. According to certain example embodiments, the load balancing system is configured to distribute the total load from all clients in a set of clients equally to each server in the set of servers. Thus, for example, a load balancing system according to an embodiment may be configured to distribute fractional units of load from multiple clients (e.g., two clients) to one server with the total sum of the load from these clients to the server always being equal to the load of the other servers, e.g., one unit of load. As servers may be assigned to different numbers of server subsets (e.g., some servers may be assigned to two subsets while other servers are assigned to only one subset), different amounts of fractional load may be assigned to a server in each subset to which it is assigned in order to configure the load balancing system to distribute the same amount of load to each server in the set of servers. Although different load amounts may be assigned to the same server for different clients in certain example embodiments, the total sum of the loads assigned to the server is the same as that of the other servers.

FIG. 1 illustrates a non-limiting, example system 100 in which balancing load from a set of clients across a set of servers is implemented according to certain example embodiments. Some example embodiments may have different and/or additional devices and sub-modules than those described in relation to FIG. 1. Moreover, in other example embodiments, the described functions may be distributed among the sub-modules in a different manner than is described.

The system 100 comprises a set of clients 110, a set of servers 120 (also referred to as "processing resources"), a set of user devices 140 that may be operated by end users, and a central server 130. The set of clients 110, set of servers 120, and central server 130 may be communicatively connected via a network such as a local area network and/or wide area network (e.g., internet). The communicative connections may include wired and/or wireless connections. User devices 140 may be connected (by wired and/or wireless connections) to the clients 110 via the internet. In certain example embodiments, service requests (also referred to as "processing requests") originating on the user devices 140 are received by the clients 110 and distributed to the servers 120. These service requests can include, by way of example and without limitation, transmitting messages (e.g., a social media post), requesting messages (e.g., accessing a social media post, requesting a timeline), search requests, and the like. The central server 130, for example, may be a naming service server or the like, and may not be required in some example embodiments.

Each client in the set of clients 110, for example, clients 111, 112, and 113 (also referred to as clients 1, 2, and 3), may be a frontend server, such as, for example, a proxy server, or the like. According to some example embodiments, at a particular organization and/or server farm, the set of clients 110 may include all proxy servers or the like that receive all incoming service requests for a particular service (e.g., service requests for messaging). The set of clients 110 are configured to load balance service requests they receive by distributing the service requests among the set of servers 120. Some of the clients 110 may perform additional tasks such as routing, etc. In some example embodiments, the set of clients 110 may be homogenous, whereas in other example embodiments the set of clients 110 may include non-homogeneous clients.

Each server in the set of servers 120, for example, servers 121-127 (also referred to as servers 0-6), may be a backend server, such as an HTTP server or the like. Each server 121-127 may be configured to receive service requests from clients, perform computing and respond to the client or other entity. According to some example embodiments, at a particular organization and/or server farm, the set of servers 120 may include all HTTP servers, application servers or the like that process service requests for a particular type of service (e.g., service requests for messaging). In certain example embodiments, the servers 121-127 are homogeneous in that they have identical or similar configurations. In some example embodiments, the servers 121-127 are homogeneous in processing capabilities (e.g., one or more of processor types, processor numbers, memory capacity, etc.) and incur identical or at least similar times to process identical load amounts of service requests received from clients. In yet other example embodiments, the servers 121-127 may not be homogeneous with respect to each other, and may incur different amounts of times and/or system capacities with respect to each other to process identical load amounts of service requests.

Some of the set of clients 110 and/or some of the set of servers 120 may not necessarily be separate or different machines. In some example embodiments, at least some of the set of clients 110 and/or servers 120 may be multiple virtual machines running on one or more hosts interconnected by a communication network.

Examples of the user devices 140 may include a desktop computer, a mobile phone, a laptop computer, a tablet computer, or any of other kinds of devices that are configured to generate service requests automatically or in response to user input(s). As shown in FIG. 1, in certain example embodiments, the user devices 140 are, respectively, a laptop computer 141, a mobile phone 142, a desktop computer 143, and other electronic devices. However, it will be appreciated that other types of properly configured devices (e.g., home appliances, Internet of Things (IoT) devices, and the like) may be used as a user device 140. For example, in some embodiments, user devices 140 may include a server or the like that generates service requests. One or more of the user devices 141-143 may initiate a stream of requests (e.g., HTTP requests) sent to one or more of the set of clients 110.

In certain example embodiments, services are implemented as many homogeneous and/or interchangeable servers 120 running on a set of computers. On the other hand, clients 110 running on a set of computers hold connections to these servers. In an example embodiment, a stream of service requests, such as HTTP requests, may be transmitted from the user devices 140 to the set of clients 110. For each incoming service request, a client may determine which server(s) should handle the request and then transmit the service request (or corresponding one or more processing requests) to the server(s). In some examples, a single incoming request may trigger a series of dependent processing requests to several servers.

In an ideal case, the load of service requests for a given service is spread evenly over all servers providing that service and, at any given point in time, these servers each consume the same amount of processing resources and/or have the same or similar response times.

As described above, clients 110 may include any type of frontend server that receives service requests from other devices (e.g., user devices 140) and direct that traffic, with or without having performed some processing and/or modifications on that traffic, to one or more servers 120 that perform backend processing responsive to the service requests. The servers 120 may respond to the user device 140 that originated a service request either directly or via one of the clients 110. In an example embodiment, the load balancing system's clients and servers are implemented on a Finagle platform (Finagle is an extensible RPC system for the JVM, used to construct high concurrency servers). For example, the set of clients 110 may be Finagle processes operating as HTTP servers configured to receive incoming service requests from instances of a social network application running on user devices 140 and to distribute the service requests to the set of servers 120 of Finagle processes that perform application processing responsive to the service requests. These service requests can include, by way of example and without limitation, transmitting messages, requesting messages (e g., requesting a timeline), search requests, and the like.

In some embodiments, service requests from a client to a server are transmitted over an established connection between the client and server. Connections between each of the set of clients 110 and one or more of the set of servers 120 may be established and maintained in different ways. In an example embodiment, a pool of connections between a client and its associated servers are established as the client starts up and/or is initialized and will remain open, with service requests flowing through them, until the client is shut down or fails. In another example embodiment, a connection is established and terminated for each service request, possibly resulting in significant cost and latency. In yet another example embodiment, after a connection remains idle for a long time, it may be switched to a cheap "inactive" mode, in which less resources are used to maintain the connection.

In certain example embodiments, each client in the set of clients 110 is configured to balance its load by distributing its service requests to a smallest subset ("aperture") of servers that can satisfy the client's concurrency requirements. Concurrency requirements may be preconfigured and specified as a number of concurrent connections to be maintained by a client. For example and without limitation, FIG. 1 illustrates a server subset configuration in which clients 110 each have a concurrency requirement of three concurrent connections. As shown in FIG. 1, client 111 is assigned a server subset 151, client 112 is assigned a server subset 152, and client 113 is assigned server subset 153. Client 111 only connects to servers 121, 122 and 123 in server subset 151, client 112 only connects to servers 125, 126, and 127 in server subset 153, and client 113 only connects to servers 123, 124, and 125 in server subset 152. After the initial configuration of subsets, each client in the set of clients 110 operates independently to distribute its load among the servers in its corresponding subset of servers such that the total load from all clients in the set of clients 110 is evenly distributed across the set of servers 120. This configuration allows each of the clients to use resources commensurate to its offered load and incur penalties associated with connection establishment less frequently. That is, clients in these example embodiments are not required to maintain connections with every server in a large set of servers, and are required only to maintain connections to the typically much smaller number of servers in its assigned subset of servers.

An appropriate size for server subsets for a load balancing system according to example embodiments may be determined based on the characteristics of the system. In an example embodiment, a system operator may determine a subset size based on historical load of the system and input to the system. In other example embodiments, a subset size may be automatically determined by a central server or a client based upon historical information and/or the latest load in the system. Moreover, in certain example embodiments, a determined subset size may be communicated from the central server to all of the clients or from one client to the other clients. For example, when the number of clients in the set of clients 110 is significantly smaller than the number of servers in the set of servers 120, the subset size can be large enough so that none of the servers will never receive any of the load distributed by the clients. In another example, in some systems, there can be frequent load imbalances among the clients. For example, some of the clients may occasionally send "bursts" of requests. Because these bursts of requests will only be concentrated in those clients' assigned subsets of servers, a larger subset size may be needed in order to ensure that load is spread evenly across servers in the set of servers.

In certain example embodiments, the server subset size may be automatically determined (e.g., by a client and/or a central server in communication with the load balancer) in accordance with, for example, client load and/or certain preconfigured restriction requirements of clients. That is, in example embodiments, a client may determine a subset size that accommodates its expected load, e.g., its historical load and/or currently pending service requests. Moreover, for certain example embodiments, it is desirable that the number of connections for each client be at or above a minimum numbers of connections required, for example, to ensure that even low-throughput clients have a relatively safe amount of redundancy. In some example embodiments, the load balancing system may include a feedback controller on a client or a central server that can organically accommodate a client's load. Although, in the example embodiment illustrated in FIG. 1, the size of each of the server subsets 151-153 is 3, the present disclosure is not limited him this respect and different subset sizes may be used depending on a particular system, as discussed above.

The example embodiments described herein improve on conventional random subsetting and deterministic subsetting by introducing, among other things, "fractional load." Fractional load enables at least some clients to send an entire unit load amount to some servers in their respective server subsets, while sending fractional amounts of a unit load to others of the servers in their respective subsets. A server may be sent fractional units of load from multiple clients with the total sum of the loads from these multiple clients preferably being equal to the respective loads of the other servers in the set of servers. According to some example embodiments, all servers in the set of servers are loaded equally with at least one boundary server (e.g., a server that is in more than one server subset) receiving a total load of a full unit load from two or more clients each of which sends a fractional amount of load. For example, one server in the set of servers 120 may receive different fractional units of load (e.g., ⅓ and ⅔ unit of load) from two clients in the set of clients 110 with the total sum of the load from these two clients being equal to the load of the other servers (e.g., one full unit of load). In other example embodiments, none of the servers of the set of servers receives fractional amounts of load. That is, each server in the set of servers may only be in one server subset and may receive a full unit load from only one client. For example, when there are three clients and nine servers and the required minimum number of connections is 3, each client will simply connect with three servers.

As servers may be assigned to different numbers of subsets or clients in example embodiments, some servers may be assigned to two subsets/clients while other servers are assigned to only one subset/client. Accordingly, in example embodiments, a client may be configured to assign different relative load weights to different servers in its server subset. For example, if the client is to send a unit load amount of service requests to a first server in its assigned subset of servers, it may assign a relative weight of 1 to the first server, and if the client is to send a fraction x of a unit load amount of service requests to a second server in its subset, it may assign a relative weight of x to the second server. The sum of the relative weights assigned to any particular server by all clients that send service requests to it may be equal to the relative weight corresponding to a unit load. In the example embodiment illustrated in FIG. 1, various relative load weights are determined for servers in each subset, as follows: (1) in the server subset 151 for client 1: servers 0-2 are assigned with relative load weights 1, 1, and ⅓ respectively; (2) in the server subset 153 for client 2: servers 4-6 are assigned with relative load weights ¼, 1, and 1 respectively; and (3) in the server subset 152 for client 3: servers 2-4 are assigned with relative load weights ⅔, 1, and ⅔ respectively.

In this example, the total sum of the relative load weights of the servers in each subset is the same, e.g., 2⅓, meaning that each client is assigned the same amount of server capacity.

Moreover, all of the servers preferably receive the same volume of service requests from their connected clients. As shown in FIG. 1, in this example embodiment, servers 0, 1, 3, 5 and 6 are each is assigned to only one subset, and their relative load weights are the same, e.g., 1. In contrast, servers 2 and 4 are each assigned to two subsets, and they may each receive a fractional unit of load (e.g., ⅓ and ⅔) from two clients with the total sum of the load received at each of servers 2 and 4 being equal to one, which is the same as the relative load weight of the other servers in the set of servers. In accordance with the relative load weights assigned to server 2 in the subsets 151 and 152, server 2 will be sent a fraction ⅓ of a unit load from client 1, relative to one unit load sent from client 1 to each of servers 0 and 1, and will be sent a fraction ⅔ of a unit load from client 3, relative to one unit load sent from client 3 to server 3. Similarly, in accordance with the relative load weights assigned to server 4 in subsets 152 and 153, server 4 will be sent a fraction ⅓ of a unit load from client 2, relative to one unit load sent from client 2 to each of servers 5 and 6, and will be sent a fraction ⅔ of a unit load from client 3, relative to one unit load sent from client 3 to server 3.

When service requests are transmitted from clients to servers in accordance with the above configuration, the total sum of the load received by server 2 or 4 is the same as the load received by the other servers. Thus, by using fractional loads as described, the load from the set of clients 110 may be uniformly distributed across the set of servers 120.

The load balancing system according to example embodiments operates to configure the set of clients 110 to distribute the total load evenly among the set of servers. In certain example embodiments, each client in the set of clients 110 includes an independent load balancer, so that load balancing decisions are made independently by each client in the set of clients 111-113. In various example embodiments, the load balancing decisions may be made independently by each client in the set of clients, without any one or more of, a centralized coordination mechanism, explicit coordination between clients, or specific relationships between the sizes of the set of client and the set of servers. According to certain example embodiments, to make load balancing decisions, each client in the set of clients 110 (e.g., clients 111-113) is only required to know the size of the set of clients, its "position" in the set of clients, the size of the set of servers, and addresses of the servers in order to connect to them. Among many other advantages, this architecture not only allows each client to reduce latency and increase success rate associated with distributed service requests, but also enable clients to operate with fewer dependencies and points of failure while still converging on balanced (e.g., evenly distributed) global load distribution.

In some embodiments, the size of the set of clients and/or the size of the set of servers may change over time. For example, certain clients or servers may become unavailable or disconnected for upgrading, replaced or temporarily shut down. Any such changes to the sets of clients or servers may cause load balancing decisions to be recalculated. Therefore, it is desirable for each client to know the current status of the set of servers and the set of clients. In an example embodiment, a client may subscribe to information regarding selected status changes of the set of servers and the set of clients from the central server 130. For example, the central server may include a peer server set watcher as a process which monitors (e.g., continuously or periodically) the size and/or composition of the set of servers, and each client in the set of clients may register a recalculation of the server subsets (e.g., a closure) to run in its respective process when the peer server set watcher signals a change in the set of servers.

In an example embodiment, each client (e.g., implemented as a Finagle process) in the set of clients maintains a persistent connection to a central server, such as, a naming service server (e.g., a WilyNS endpoint or a lookup bound endpoint) which operates to push updates from a bound name. A lookup bound service running on the lookup bound endpoint may use a data structure such as the map Map[Path, (Option [Response], Queue [Promise])]. Each server in the set of servers and/or the set of servers being monitored may be represented as a bound name in the map. Client subscriptions requesting to be notified regarding updates may be represented as "promises" in the map. Each requested bound name (represented as a "Path" in the map) may have the last good response, along with a queue of requests waiting for the next response. When the set of servers updates, the lookup bound endpoint may update the last good response and drain the queue by fulfilling each promise. In this way, the naming service server may "push" updates to clients that have subscribed for such updates. Clients may subsequently send a follow-up request after receiving a "push"—this pattern may sometimes be referred to as "long-polling". In order to synchronize clients and the naming service server's view of the set of servers, client requests may include an optional stamp. If the stamp matches the stamp of the last cached response, the request is enqueued in the map. Otherwise, the request is satisfied synchronously.

In another example embodiment, load balancing decisions may be made (instead of, or in addition to, being made independently by the respective clients) by the central server 130 based on relevant information, including the size of the set of clients, an identifier of each client (e.g., an index or a "position" of the client in the set of clients), and the size of the set of servers. In example embodiments, identifiers of the set of clients may be sorted, and hence the identifier of each client may have a unique "position" with respect to other identifiers, in some embodiments, servers and clients may selectively update the central server 130 with respect to changes to their operating status to enable the central server 130 to dynamically make load balancing decisions. That is, the central server 130 may determine the load balancing configurations for each of the clients in the set of clients 110 and may distribute the configurations to the respective clients that thereafter operate to distribute load according to those configurations. In some other embodiments, the central server 130 may itself actively monitor (e.g., by polling) for changes in the set of clients and/or the set of servers. With respect to load balancing decisions, such as recalculations and/or reconfigurations of server subsets etc., being made centrally at the central server 130, at least in some aspects, a naming service server is natural point of integration for this functionality since the naming server is responsible for directing clients to particular servers, for example, by interpreting a client's logical destination address and returning a concrete bound name or address.

Figure 2:
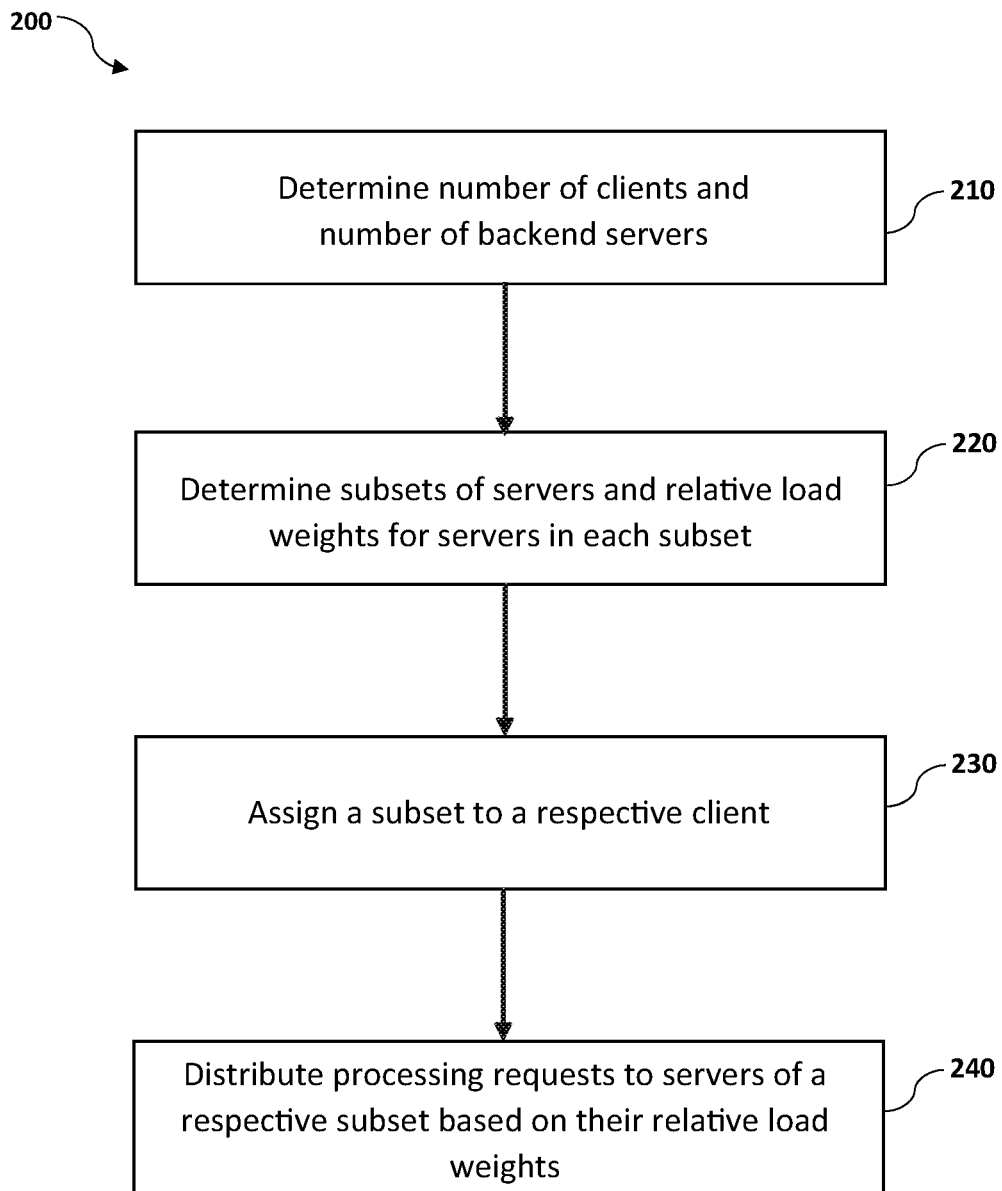
FIG. 2 illustrates a non-limiting, example workflow for an example load balancer.

FIG. 2 illustrates a non-limiting, example workflow of a process 200 for an example load balancer. In certain example embodiments, process 200 may be implemented by each of the clients in a set of clients such as the set of clients 110. The set of clients 110, with each implementing an instance of process 200, may operate to configure the set of clients to evenly distribute load according to example embodiments.

After entering process 200, at operation 210, the load balancer determines the total number of clients as a client set size and determines the total number of servers as a server set size. For example, in the system 100 of FIG. 1, the client set size of the set of clients 110 would be determined as 3, and the server set size of the set of servers 120 would be determined as 7. In some example embodiments, the set of clients 110 are logically arranged in an ordered sequence and each client is assigned a unique identifier (e.g., an "index number") representing its "position" in the ordered sequence relative to the other clients. In these example embodiments, process 200 may also determine a position for at least one client in the set of clients.

Based at least on the determined server set size, the set of servers, and the determined client set size, a plurality of subsets of servers and relative load weights for servers in each subset are determined at operation 220. In some example embodiments, each of the server subsets includes the same number of servers. In other example embodiments, server subsets may include different numbers of servers. For example, when the client set size multiplied by the number of connections required by a client is not a multiple of the server set size, some servers may be assigned to multiple subsets (e.g., server 2 in FIG. 1 being assigned to subsets 151 and 152). Relative load weights may then be assigned to each server in each server subset, where, for each server, the assigned relative load weight in a particular subset represents a relative proportion of the total load that it is expected to receive. In order to configure the load balancing system to distribute the same volume of service requests to each of the servers in the set of servers, different relative load weights may be assigned to different servers in each subset. For example, as described above in relation to FIG. 1, server subset 151 has relative load weights 1, 1, and ⅓ assigned respectively to server 0, server 1, and server 2; and server subset 152 has relative load weights ⅔, 1, and ⅔ assigned to server 2, server 3, and server 4, respectively. In this example, the relative weight 1 assigned to server 0 may represent that the total load for server 0 is to be received from the client to which the subset 151 is assigned; likewise, the relative weight 1/3 assigned to server 2 as a member of subset 151 may represent that server 2 is to receive only 1/3 of its total load from the client to which subset 151 is assigned. In accordance with the different relative load weights, different proportions of the service requests may be transmitted from a client to respective servers in its assigned subset. The total sum of the relative load weights assigned to each server in its associated subset(s) is the same as that of the other servers, and hence, in some embodiments, the same volume of service requests will be transmitted to each of the servers. It should be noted that although in the above example, in which the set of servers is not logically duplicated for forming server subsets, the relative load weight ⅓ represents ⅓ of the total load at server 2. In cases in which the set of servers is duplicated prior to forming server subsets, a relative weight w assigned to a server by one client does not represent a fraction w of the total weight assigned to that server.

In certain example embodiments, the determination of the subsets may also be subject to other constraints, such as, for example, having a server subset size that is equal to or greater than a specified minimum number of connections required for each client. The specified minimum number of connections for a client can be considered as a minimum concurrency requirement to, among other things, ensure that each client had a minimum level of redundancy. Since, as noted above, a client establishes a connection with each server to which it distributes load, the minimum number of connections requirement represents a minimum number of servers that are required to be in a server subset. The load balancer may operate to determine server subsets that, in addition to satisfying the criteria specified in the previous paragraph, also meets specified constraints, such as, for example, the minimum connection constraint. If the size of the server subset determined according to the criteria described in the paragraph above is less than the specified minimum number of connections, then the set of servers may be logically expanded by duplicating the servers a number of times sufficient to satisfy the constraints, and the logically expanded set of servers may be divided among the set of clients. In some embodiments, instead of being statically configured as a configuration parameters the system may dynamically determine the minimum number of connections based, for example, on projected and/or actual load amounts. Further details of operation 220 are described in relation to FIGS. 3A and 3B.

At operation 230, after the determination of the server subsets and relative load weights for servers in each subset, each determined subset is assigned to a respective client. In some example embodiments, the assignment of a server subset to a client may be made according to the client's "position" in the set of clients relative to the other clients, for example, specified as a unique identifier (e.g., an index) assigned to the client. In other example embodiments, other technique may be used to assign each subset to a respective client. In example embodiments, when all the clients in the same set of clients use unique identifiers (positions) based on the same ordered sequence, each client may perform operation 230 independently to determine its assigned server subset (or the same set of server subsets and assignments as other clients) such that the server subsets are uniformly assigned to the clients uniformly. Although FIG. 2 illustrates operation 230 as following operation 220, it should be understood that each subset may be assigned to a respective client in the set of clients at operation 220.

Operations 210-230 relate to establishing the configurations in each of the clients 110. After the configurations are determined, each client may establish a connection to each of the servers in its server subset. The connections may be used for distributing the service requests.

At operation 240, a client may distribute service requests to the servers of its assigned subset in accordance with their relative load weights. In certain example embodiments, a client may transmit a weighted-quantity or a proportion of service requests to each of one of more servers in its assigned subset, while also transmitting another weighted-quantity or another proportion of service requests to at least one other server in its assigned subset, and the other weighted-quantity is a fraction of the weighted-quantity (or, equivalently, the other proportion is a fraction of the proportion). In the example system 100 shown in FIG. 1, the client 1 may transmit a first weighted-quantity (e.g., a unit load) of service requests to servers 0 and 1, while transmitting a second weighted-quantity of service requests to server 2. Moreover, the second weighted-quantity is a fraction (e.g., $\frac{1}{3}$) of the first weighted-quantity. That is, the second weighted-quantity is a $\frac{1}{3}$ fractional load of the unit load.

Another client may distribute a fractional load to more than one server in its assigned subset. For example, in the example system 100 shown in FIG. 1, client 3 distributes a $\frac{2}{3}$ fractional load to each of server 2 and server 4 respectively, relative to one unit of load distributed to server 3, in its assigned subset 152.

According to example embodiments, while each client in a set of clients may transmit service requests to several servers in a set of servers, respective servers in the set of servers may receive service requests from different numbers of clients. For example, some of the servers may receive service requests from multiple clients, while other servers may only receive service requests from a single client. In the example system 100 shown in FIG. 1, servers 2 and 4 will receive service requests from two clients, while the other servers only receive service requests from a single client.

Figure 3A:
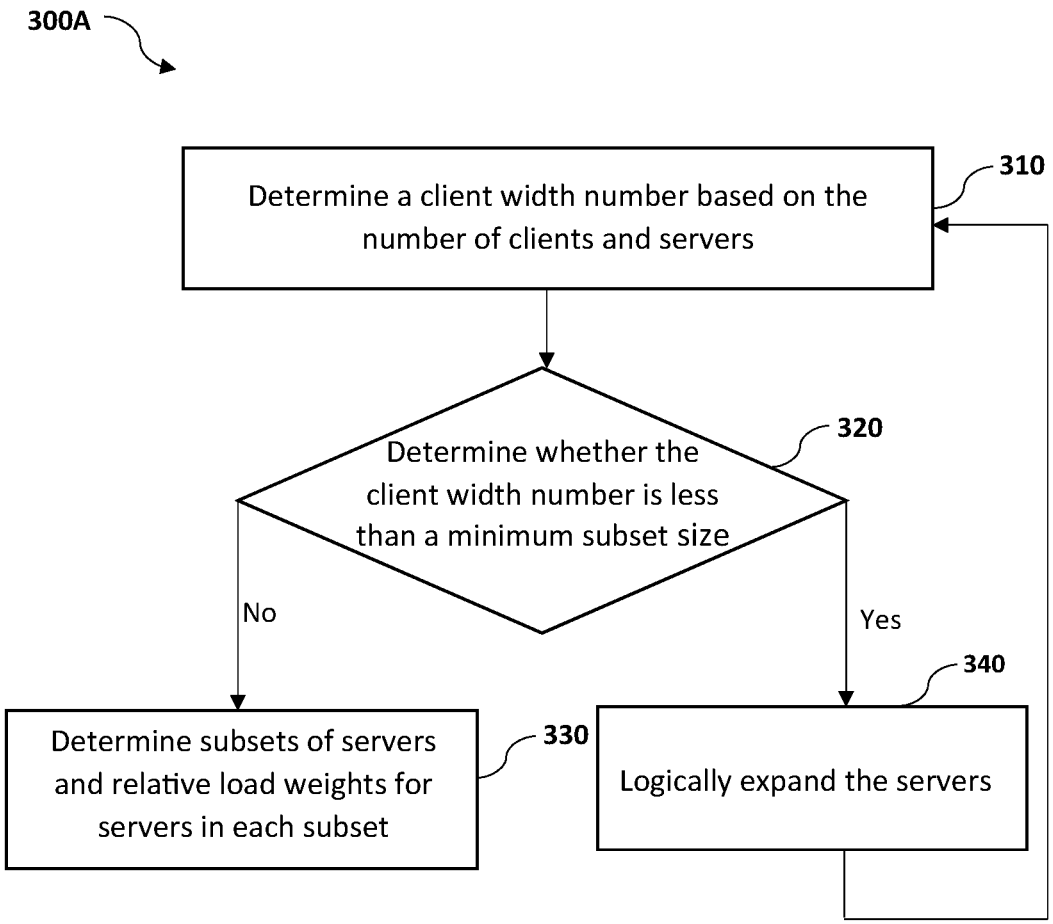
FIG. 3A illustrates a non-limiting, example workflow for determining subsets of servers and relative load weights for servers in each subset.

FIG. 3A illustrates a non-limiting, example process 300A for determining subsets of servers and relative load weights for servers in each subset. According to some embodiments, process 300A may be performed during operation 220 of process 200 described above with respect to FIG. 2.

At operation 310, a client width number is determined based on the number of clients (e the size of the set of clients) and the number of servers (e.g., the size of the set of servers). In some aspects, the client width number can be considered as the amount of unit loads of service requests to be distributed by each client. In an example embodiment, the client width number is calculated by dividing the number of servers by the number of clients. In the example system shown in FIG. 1, the client width number is $2\frac{1}{3}$, which is the result of dividing the number of servers (e.g., 7 in FIG. 1) by the number of clients (e.g., 3 in FIG. 1).

At operation 320, the load balancer determines whether the client width number is less than a minimum subset size, such as the above described specified minimum number of connections required for each client.

If the load balancer deter mines at operation 320 that the determined client width number is not less than the minimum subset size, then it will determine subsets of servers and relative load weights for servers in each subset at operation 330 as described above. For example, if the specified required minimum number of connections for each client in the system 100 is 2, which is less than the calculated client width number $2\frac{1}{3}$, then the server subsets can be determined by dividing the set of servers 120 into three equal-sized subsets for the set of clients 110 as described above.

On the other hand, if the load balancer determines at operation 320 that the determined client width number is less than the minimum subset size, then it logically expands the servers in the set of servers at operation 340. The set of servers may be logically expanded by duplicating the servers in the set of servers. For example, the seven servers shown in FIG. 1 in the set of servers may be logically expanded by duplication to fourteen servers, or twenty-one servers, etc., so that the client width number, re-calculated based on the logically expanded set of servers, is larger than the minimum subset size.

In the system 100 shown in FIG. 1, if the minimum number of connections required by each client is 4, then the initial client width number $2\frac{1}{3}$ as calculated at operation 310 is less than the required minimum number of connections. As a result, the load balancer can logically expand the set of servers by duplicating these servers to be fourteen server instances, and hence each of the servers may be regarded as two server instances, each of which will be assigned to at least one server subset. As a result, due to the logical expansion of servers, each server in the set of servers may be assigned to at least two subsets of servers, and hence may receive service requests from at least two clients, as indicated in FIG. 4.

Figure 4:
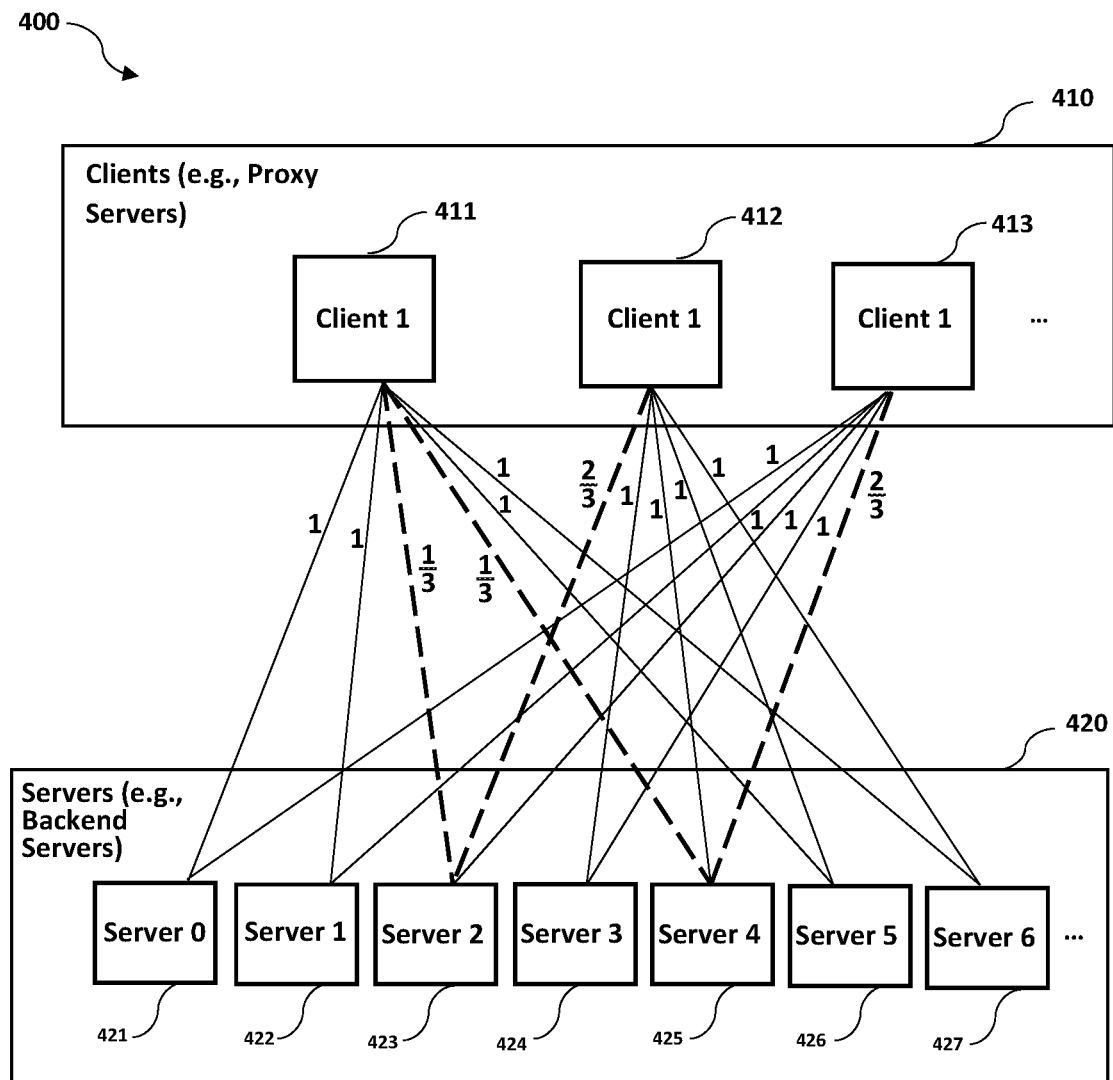
FIG. 4 illustrates a non-limiting, example configuration of another example system supporting balancing load from set of clients across a set of servers.

FIG. 4 illustrates a non-limiting, example configuration of another example system 400 for balancing load from a set of clients 410 (e.g., clients 411, 412, and 413 or clients 1-3) across a set of servers 420 (e.g., servers 421-427 or servers 0-6). In this example system 400, the number of clients 410 is 3, the number of servers 420 is 7, and the minimum number of connections required by each client is 4. As a result, a client width number $2\frac{1}{3}$, as initially calculated at operation 310, is less than the required number of connections 4. Consequently, the set of servers 420 is logically expanded to include fourteen server instances at operation 340.

After the logical expansion of the servers at operation 340, the load balancer proceeds to operation 310 to re-calculate another client width number based on the number of clients and the number of the expanded server instances (e.g., size of the expanded set of servers). For example, for the example system illustrated in FIG. 4, at operation 310, a client width number ($4\frac{2}{3}$) may be calculated by dividing the number of the expanded server instances (e.g., 14) by the number of the clients (e.g., 3). Thus, the balancer will determine at operation 320 that the client width number $4\frac{2}{3}$ is no longer less than the required number of connections 4, and hence subsets of servers can be determined based on the expanded server instances at operation 330.

Figure 3B:
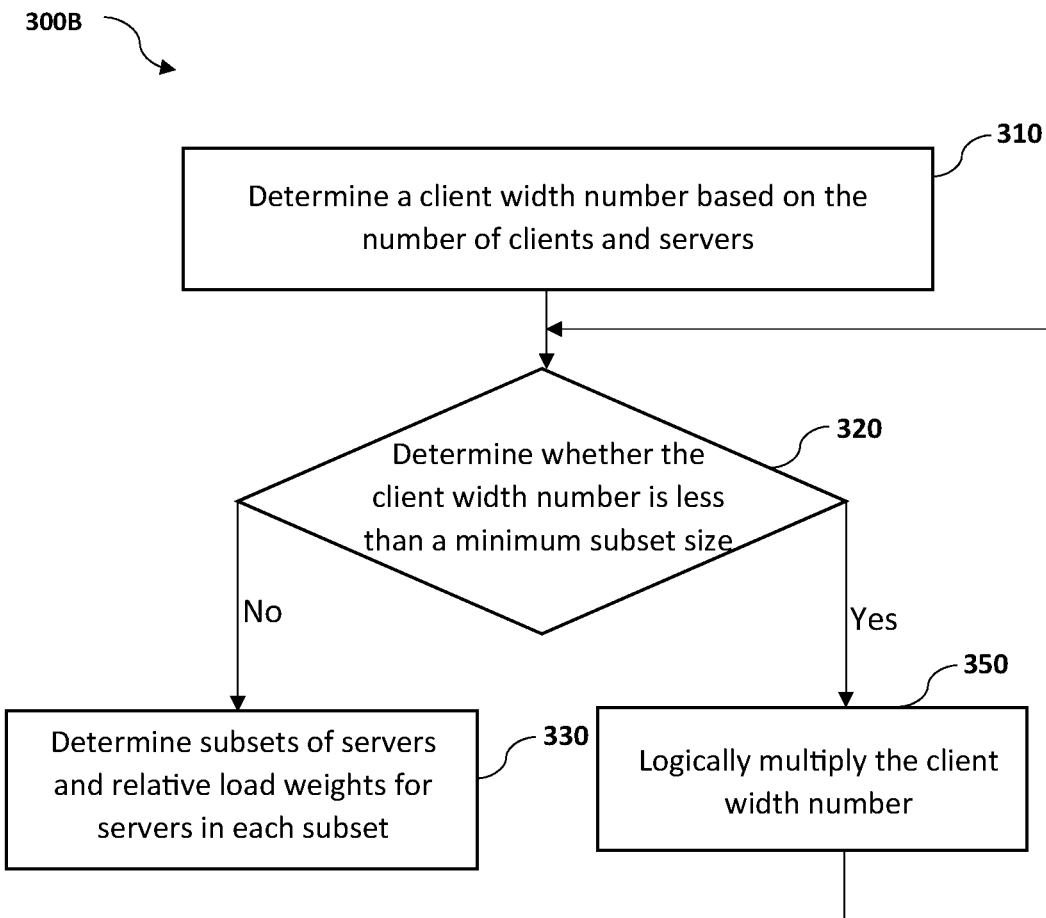
FIG. 3B illustrates a non-limiting, example workflow for determining subsets of servers and relative load weights for servers in each subset.

FIG. 3B illustrates another non-limiting, example process 300B for determining subsets of servers and relative load weights for servers in each subset. According to some embodiments, process 300B may be performed during operation 220 of process 200 described above with respect to FIG. 2. As shown in FIG. 3B, process 300B comprises the same operations of process 300A except for operation 340. That is, the operation 340 of process 300A in FIG. 3A is replaced with an operation 350 in FIG. 3B. According to the process 300B, if the load balancer determines at the operation 320 that the determined client width number is less than the minimum subset size, then it logically multiplies (e.g., double, triple, etc.) the client width number at the operation 350. For example, in the system 100 shown in FIG. 1, the calculated client width number $2\frac{1}{3}$ may be doubled to be $4\frac{2}{3}$. After that, it will be determined at the operation 320 that the doubled client width number is larger than the required minimum number of connections—4, and hence subsets of servers can be determined based on the expanded server instances at the operation 330.

At the operation 330, due to "fractional load" capability, some of the servers may be assigned to three subsets with different relative load weights while other servers are assigned to two subsets. Ideally, all of the servers will still receive the same volume of service requests from their connected clients. As shown in FIG. 4, a server subset including servers 0-2 and 4-6 is assigned to client 1, a server subset including servers 2-6 is assigned to client 2, and a server subset including servers 1-4 is assigned to client 3. Thus, client 1 will send service requests to six servers, while clients 2 and 3 will send service requests to five servers. Moreover, different relative load weights may be assigned to different servers in each of these subsets, as: (1) In the server subset for client 1: a relative load weight 1 is assigned to server instances 0-1 and 5-6, and a relative load weight $\frac{1}{3}$ is assigned to both server instances 2 and 4; (2) in the server subset for client 2: a relative load weight 1 is assigned to server instances 3-6 and a relative load weight $\frac{2}{3}$ is assigned to server instance 2; and (3) In the server subset for client 3: a relative load weight 1 is assigned to server instances 0-3, and a relative load weight $\frac{2}{3}$ is assigned to server instance 4.

In this example, the total sum of relative load weights of all of the servers in each subset is the same as the determined client width number—$4\frac{2}{3}$, and the total sum of the assigned relative load weights assigned to each of the servers is also the same—2.

Figure 5:
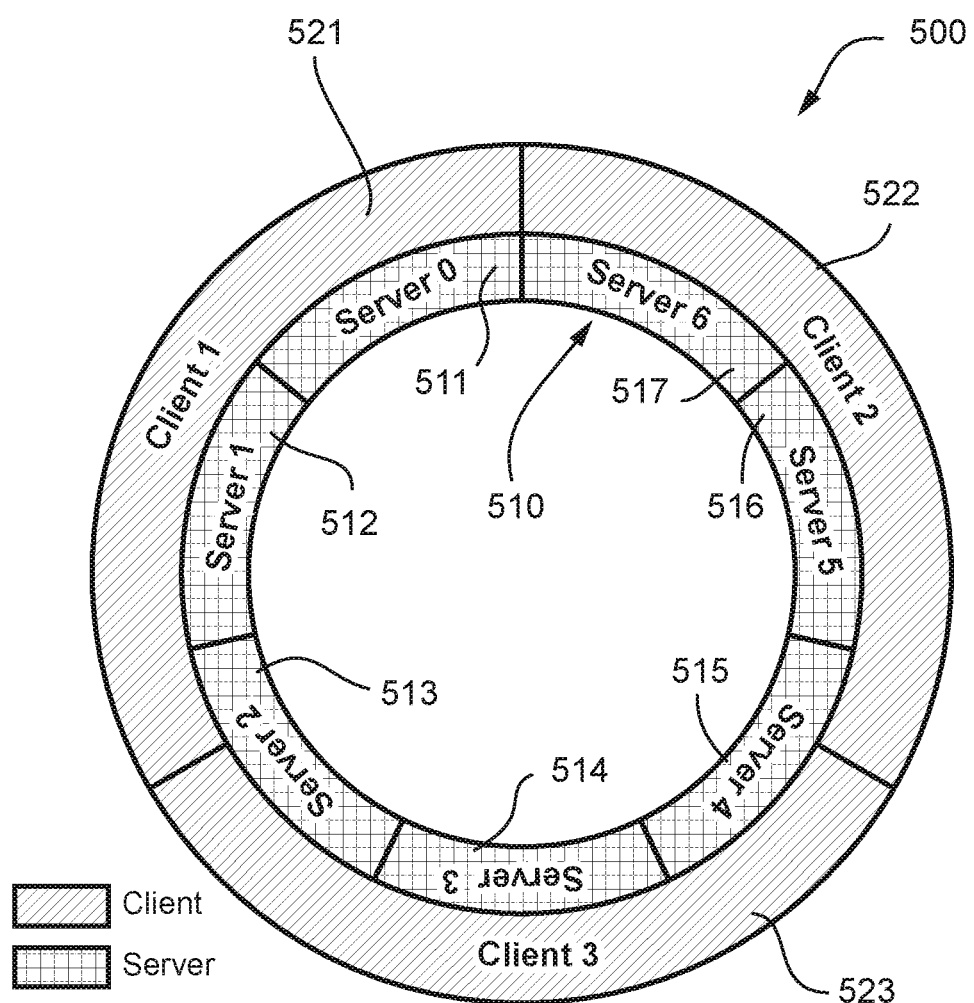
FIG. 5 illustrates a non-limiting, example logical ring topology for server subsets and relative load weights of servers in each subset.

The above described methods of determining subsets of servers and relative load weights for servers in each subset may be implemented, according to some embodiments, by forming (e.g., in the memory of the computer performing process 200 described above) a logical ring topology representing relationships between a set of servers (e.g., set of servers 120) and a set of clients (e.g., set of clients 110). FIG. 5 illustrates a non-limiting, example logical ring topology 500 that may be used in determining server subsets and relative load weights of servers in each subset. In the ring topology 500, a set of servers are uniformly distributed on a continuous logical ring (e.g., a server ring) 510 in a manner that each server is assigned a "slice" of a same length on the ring. For example, the entire circumference of the ring can be equally divided among the set of servers so as to assign a slice of the circumference to each server in the set of servers. A slice assigned to a server may be referred to as a "server slice". In addition, the entire circumference of the ring is also equally sub-divided and allocated to each of the clients in the set of clients, so that each client is also assigned its own portion of the ring. A portion of the ring assigned to a client may be referred to as the "domain" of the client, and that client is configured to only distribute service requests to servers within its domain. That is, each client is configured to distribute service requests only to servers whose server slices overlap the client's own assigned portion (i.e. domain). It is noted that, due to the capability to distribute fractional loads as described above, the lengths of the portions of the ring assigned to all of the clients are the same.

In the ring topology 500 shown in FIG. 5, seven servers (servers 0-6) are uniformly distributed on a continuous ring 510. Servers 0-6 are assigned to slices 511-517 respectively, and the lengths of the slices 511-517 are the same. As described above, the concept of fractional aperture is introduced in example embodiments to enable a client to distribute fractional units of load to one or more server(s). As a result, a server ring can be represented as a continuous ring and can be divided at any point of the ring. This allows a load balancer to naturally express full ring coverage—each client is required to communicate with the servers which fall within its domain (e.g., servers whose server slices overlap that client's portion of the ring). Moreover, in contrast to conventional deterministic subsetting, a client is not required to treat the servers in its assigned subset equally, as different proportions of service requests may be sent from the client to different servers.

In this example, due to the capability of clients to distribute fractional loads, the ring is evenly divided into three client slices 521, 522, and 523 for clients 1-3 respectively, and hence each client is equally assigned $\frac{1}{3}$ portion of the entire ring. The boundaries of the portions 521-523 assigned to each client do not need to be aligned on the edges of server slices 511-517. That is, a server slice (e.g., one of the slices 511-517) can be shared by two clients. For example, in FIG. 5, the server slice 513 for server 2 is shared by clients 1 and 3, and the server slice 515 for server 4 is shared by clients 2 and 3.

By evenly dividing the server ring 510 among the clients 1-3, the ring topology 500 represents the relationship between the set of servers 0-6 and the set of clients 1-3, including the server subset assigned to each client, and relative load weights assigned to servers in each subset. For example, the ring topology 500 shows the following relationships between the servers 0-6 and clients 1-3: (1) A server subset including servers 0-2 is assigned to client 1, and servers 0-2 in this subset are assigned with relative load weights 1, 1, and $\frac{1}{3}$ respectively; (2) A server subset including servers 4-6 is assigned to client 2, and servers 4-6 in this subset are assigned with relative load weights $\frac{1}{3}$, 1, and 1 respectively; and (3) A server subset including servers 2-4 is assigned to client 3, and servers 2-4 in this subset are assigned with relative load weights $\frac{2}{3}$, 1, and $\frac{2}{3}$ respectively.

In the logical ring topology, all of the servers are loaded equally (e.g., with a full unit load amount of work). The majority of servers may each receive its full unit of load from a single client. However, a boundary server (e.g., servers that belong to more than one subset) may potentially receive a full share unit of load from two different clients. As shown in the example logical ring topology 500, servers 0-6 are loaded equally with servers 2 and 4 (which are boundary servers) each receiving a full share unit of load from two clients.

The logical ring topology illustrates features and advantages of some example embodiments. For example, in some example embodiments, changes to the set of servers as represented in the logical server ring have diminishing effects on clients whose domains are further away from the change on the logical ring. For example, replacement of a server on one part of the ring may not affect a client on the radially opposite part whose assigned portion of the ring does not overlap the changed servers. In practice, the capability to affect changes to some servers without affecting a substantial number of the server subsets may have beneficial implications by reducing resource churn and enabling the swapping/upgrading of servers with some degree of seamlessness to ongoing servicing of incoming service requests.

In the example embodiment illustrated in FIG. 5, the number of connections required by each client (e.g., the higher of the number of connections determined according to an estimated/projected load, or the specified minimum number of connections) may be 1 or 2, so that this constraint can be fulfilled by dividing the size of the server set (e.g., seven servers) evenly among the three clients without logically expanding the client slices 521, 522 and 523 or the servers 1-7. In contrast, in other example embodiments, the number of connections required by each client may be larger than the number calculated by dividing the number of servers by the number of clients. In some example embodiments, in order to accommodate the higher number of required connections, the client slices 521, 522 and 523 may be repeatedly expanded by duplicating the client slices until the total sum of portion(s) and/or the entirety of server slices overlapping each of the client slices is larger than the required number of connections. In other example embodiments, the set of servers 1-7 may be repeatedly logically expanded by duplicating the set of servers until a number calculated by dividing the size of the expanded set of servers by the number of clients is larger than the required number of connections.

Figure 6:
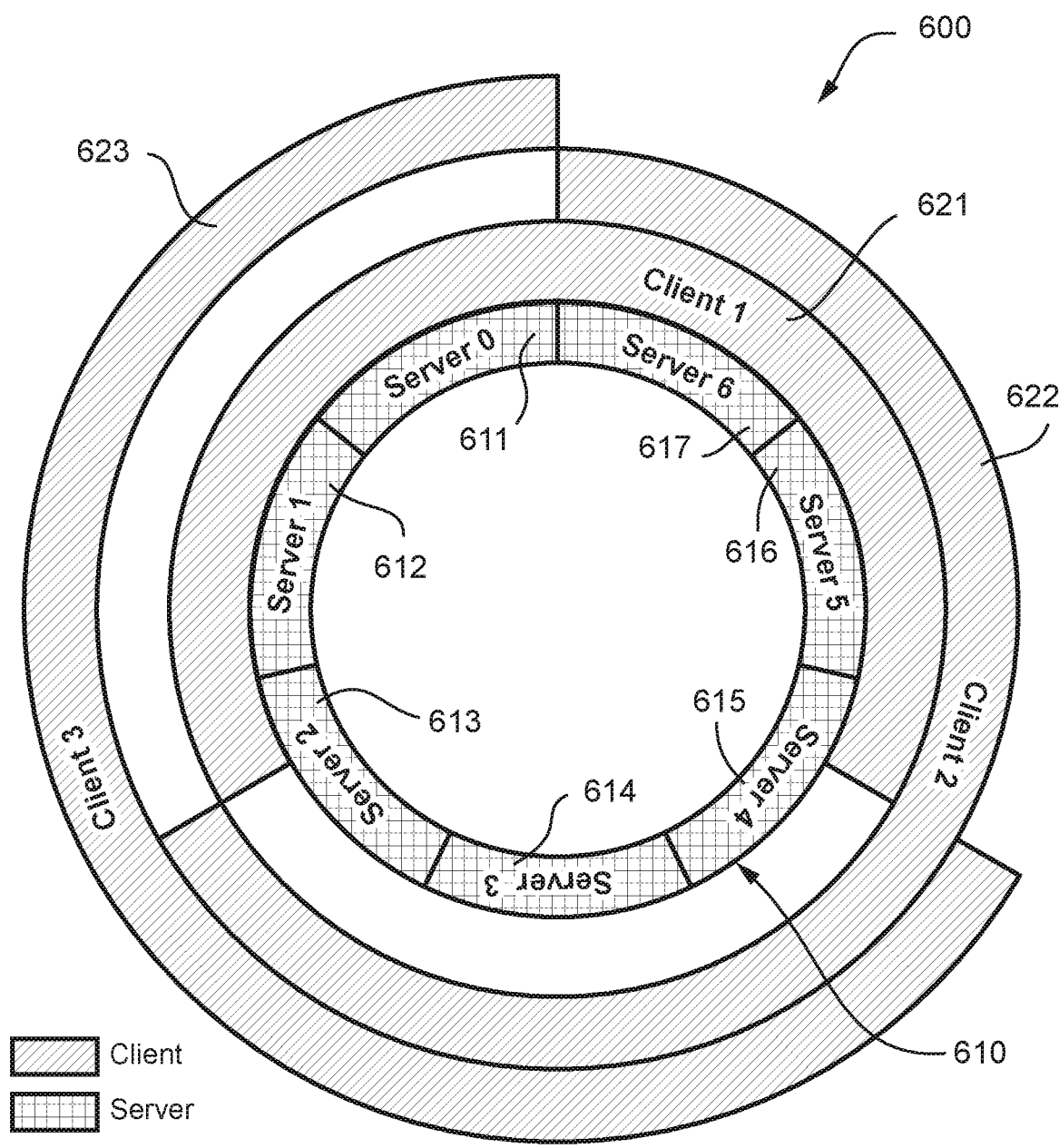
FIG. 6 illustrates another non-limiting, example logical ring determining server subsets and relative load weights of servers in each subset.

FIG. 6 illustrates another non-limiting, example ring topology 600 for determining server subsets and relative load weights of servers in each subset. In the ring topology 600, seven servers (servers 0-6) are uniformly distributed on a continuous ring 610 so that each of the servers is assigned a slice of the server ring 610 and the lengths of the server slices assigned to servers 0-6 respectively are the same. In particular, servers 0-6 are assigned to server slices 611-617 respectively.

However, in contrast to the example shown in FIG. 5, the minimum number of connections required by clients 1-3 in this example is four. Therefore, the server subsets cannot be determined by merely dividing the server ring 610 evenly into three equally-sized portions for the three clients, as that only yields 2⅓ server units for each client, which is less than 4. In other words, assigning server subsets to clients by dividing the server ring 610 equally among the three clients would yield only three connections to servers for each client—which is less than the required four connections. Therefore, in some example embodiments, the server ring 610 is logically expanded so that each client can be assigned a domain that overlaps at least four server slices. In this particular example, logically duplicating the server ring 610 once is sufficient to satisfy the client connection requirement. This logical expansion can be represented as the load balancer wrapping around the server ring 610 twice with the client domains to satisfy the required number of connections. That is, each of the seven servers is deemed as if being expanded logically to be two server instances, and the connections between clients and servers are expanded as well. After that, the logically expanded two server rings are evenly divided into three portions 621, 622 and 623 among the three clients, so that each client is assigned one portion of the expanded two server rings. In other example embodiments, each of the client slices 521, 522 and 523 may be expanded (e.g., doubled) so that each client slice overlaps at least a total of four server slices. As shown in FIG. 6, the client slices 521, 522 and 523 shown in FIG. 5 are expanded to client slices 621, 622 and 623. Due to the expansion of the client slices, the total number of servers overlapping with the expanded client slices is also expanded. That is, the connections between clients and servers are expanded as well.

As shown in FIG. 6, clients 1-3 are assigned with the portions 621-623 respectively. Each of the portions of the server rings corresponds to a subset of servers assigned to a client, and indicates the relationship between the servers in the subset and the client, including relative load weights assigned to the servers of the subset. In particular: (1) A server subset including server instances 0-2 and 4-6 is assigned to client 1, and, in this subset, servers instances 0-2 and 4-6 are assigned with a relative load weight 1, 1, ⅓, ⅓, 1, and 1 respectively; (2) A server subset including server instances 2-6 is assigned to client 2, and, in this subset, serves instances 2-6 are assigned with a relative load weights ⅔, 1, 1, 1, and 1 respectively; and (3) A server subset including server instances 0-4 is assigned to client 3, and, in this subset, server instances 0-4 are assigned with relative load weights 1, 1, 1, 1, and ⅔ respectively.

In the above example, all servers 0-6 are equally loaded with each client utilizing 4⅔ server units. Servers 0-1, 3 and 5-6 receive two full units of load from two clients, while servers 2 and 4 receive totally two full units of load from three clients. Specifically, as shown in FIGS. 4 and 6, server 2 receives ⅓ unit of load from client 1, receives ⅔ unit of load from client 2, and receives one full unit of load from client 3, while server 4 receives ⅓ unit of load from client 1, receives ⅔ unit of load from client 3, and receives one full unit of load from client 2. Servers 2 and 4 thus each receives a full share unit of load from two different clients.

According to some embodiments, a load balancer may handle restarts and failures gracefully and robustly by continuing to load servers (e.g., backend servers) uniformly while minimizing or reducing churn. To adjust load balancing in response to such changes as restarts and failures, in a load balancing system (e.g., as that described in relation to FIGS. 2-3), where all load balancing decisions are made independently by each of the clients, the client may be required to re-determine their respective subsets of servers and relative load weights for servers in each subset by any of the methods described above when is the client becomes aware of the change of the number of servers, the number of clients, the subset size, and/or its position in the set of clients. For example, when a server becomes unavailable, its clients may at least temporarily select a replacement server. When a replacement server is selected, the clients may create new TCP connections, which creates additional overhead. Similarly, when a client restarts, it may be required to reopen the connections to all its servers. Alternatively, a centralized load balancer (e.g., running on a central server) may make load balancing decisions when it is aware of any changes of the number of servers, the number of clients, the subset size, and/or the identifier of a client.

Figure 7:
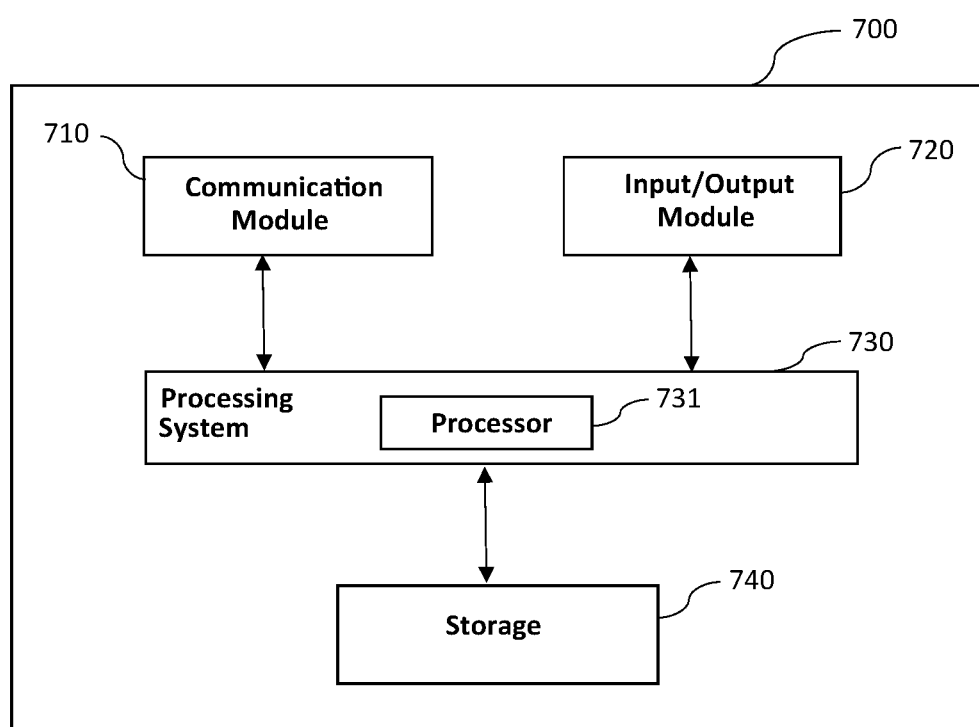
FIG. 7 illustrates a non-limiting, example block diagram for an example device on which load balancing according to embodiments can be implemented.

In the above described example embodiments, a set of clients is assumed converge on a uniform server subset size when they are offered, or configured to receive, the same amount of load. However, in some embodiments, one or more clients may dynamically expand their respective server subsets. For example, when a client receives a burst of traffic beyond projected levels such that it determines cannot be handled by the servers of the current subset, the client may temporarily expand the number of servers it distributes to by, for example, temporarily expanding its server subset. This adjustment may or may not be performed in a coordinated fashion FIG. 7 illustrates a non-limiting, example block diagram for an example device 700. The example device 700 may be a computer implementing any of the clients or any of the servers described above in connection with FIGS. 1-6, or a device hosting at least one of these clients and/or one of these servers. In this example embodiment, the device 700 includes a communication module 710, an input/output module 720, a processing system 730, and a storage 740, all of which may be communicatively linked by a system bus, network, or other connection mechanisms.

The communication module 710 functions to allow the device 700 to communicate with one or more of the other devices (e.g., user devices, clients, servers or a global server). The communication module 710 is configured to transmit data to other devices and/or receive data from other devices.

In certain example embodiments, the communication module 710 may comprise one or more communication interfaces supporting satellite communications, radio communications, telephone communications, cellular communications, internet communications, and/or the like. In other example embodiments, the communication module 710 may comprise a wireless transceiver with connected antenna, a wireless LAN module, a radio-frequency (RF), Infrared, or Bluetooth® transceiver, and/or a near field communication transceiver module. One or more of these communication components may collectively provide a communication mechanism by which the device 700 can communicate with other devices, platform and/or networks.

The data storage 740 may comprise one or more volatile and/or non-volatile storage components, such as, a hard disk, a magnetic disk, an optical disk, read only memory (ROM) and/or random access memory (RAM), and may include removable and/or non-removable components. The date storage 740 may be integrated in whole or in part with the processing system 730.

The processing system 730 may comprise one or more processors 731, including one or more general purpose processors and/or one or more special purpose processors (i.e., DSPs, GPUs, FPs or ASICs). The processing system 730 may be capable of executing application program instructions (e.g., compiled or non-compiled program and/or machine code) stored in data storage 740 to perform any of the functions and processes described above. The data storage 740 may include non-transitory computer-readable medium, having stored thereon program instructions that, if executed by the processing system 730, cause the device 700 to perform any of the processes or functions disclosed herein and/or illustrated by the accompanying drawings.

In certain example embodiments, the program instructions stored in the storage 740 may include an operating system program and one or more application programs, such as program instructions for one of the above-described load balancers. For example, the operations in example processes of FIGS. 2-3 can be defined by the program instructions stored in the storage 740 and controlled by processing system 730 executing the program instructions.

The input/output module 720 of the device 700 may enable the device 700 to interact with a human or non-human user, such as to receive input from a user and to provide output to the user. The input/output module 720 may include a touch-sensitive or presence-sensitive panel, keypad, keyboard, trackball, joystick, microphone, still camera and/or video camera, and the like. The input/output module 720 may also include one or more output components such as a display device, which may be combined with a touch-sensitive or presence-sensitive panel. In an example embodiment, the input/output module 720 may display various user interfaces to enable a user or an operator to access services or functions provided by the device 700.

As described above, the unproved deterministic subsetting load balancing techniques of various embodiments may be implemented such that the load balancing configurations are either centrally determined or are determined in a distributed manner. Whereas the central determination results in less use of computing overhead, the distributed determination further improves the resilience and robustness of the load balancing. Both types of load balancing determinations in example embodiments yield load balancing systems that enable more even distribution of loads and better control of the maximum load levels experiences in certain servers. These improved characteristics of the load balancing improve the computing performance and/or the memory use of the computers used in the load balancing system, and moreover, improves overall system latency, throughput and responsiveness. The above described embodiments may also be used for distributing load among resources other than servers, such as computers, network links, processors, hard drives, etc.

While the disclosure has been described in connection with what is presently considered to be the most practical and preferred embodiments, it is to be understood that the disclosure is not to be limited to the disclosed embodiments, but on the contrary, is intended to cover various modifications and equivalent arrangements included within the spirit and scope of the appended claims.

What is claimed is:

1. A load-balancing method for balancing a processing load of a plurality of clients among a plurality of servers, the method comprising:
assigning a different subset of the plurality of servers to each respective client in the plurality of clients, each respective client being configured to distribute processing requests only to the servers in the subset assigned thereto;
for each respective client in the plurality of clients, determining load weights for distributing processing requests to the servers in the subset assigned thereto, wherein each of the load weights indicates a relative volume of processing requests to be transmitted from the respective client to servers in the subset assigned to the respective client, the load weights for each respective client are determined such that each server of the plurality of servers processes substantially a same unit amount of processing requests and such that at least one server of the plurality of servers is assigned to multiple clients in the plurality of clients, and at least one of the load weights for each respective client is a fraction of another one of the load weights for the client; and
controlling the plurality of clients to distribute processing requests based on the determined load weights,
wherein the assigning a different subset of the plurality of servers to each respective client comprises:
representing the plurality of servers in a continuous logical ring in a memory, with a respective server slice of a first width in the ring representing each server;
evenly dividing the ring into sub-portions of a second width, the number of the sub-portions being equal to the number of clients in the plurality of clients; and assigning the subset to the respective client based upon a corresponding one of the sub-portions.

2. The method of claim 1, wherein, for the particular client, the subset of the plurality of servers assigned to the particular client and respective load weights in the subset assigned thereto are determined based upon the number of servers in the plurality of servers, the number of clients in the plurality of clients, and an identifier of the client.

3. The method of claim 1, wherein the assigning a different subset of the plurality of servers to each respective client comprises: evenly dividing the plurality of servers into said subsets based upon the number of servers in the plurality of servers and the number of clients in the plurality of clients.

4. The method of claim 1, wherein determining respective load weights for distributing the processing requests to the servers in the subset assigned to each respective client comprises:
determining the respective load weights based upon respective widths of portions of corresponding server slices overlapping with the sub-portion corresponding to the respective client.

5. A load balancing computer processing system, comprising a plurality of clients, each respective client comprising communication circuitry and a processor,
wherein the processor is configured to control the communication circuitry of the respective client to distribute processing requests to a respective subset of a plurality of servers over a communication network by transmitting a first weighted-quantity of the processing requests to each of one or more of the servers in the respective subset and transmitting to at least one other server in the respective subset a second weighted-quantity of the processing requests, the second weighted-quantity being a fraction of the first weighted-quantity such that the respective client is configured to distribute a same volume of processing requests as other clients in the plurality of clients and such that at least one server of the plurality of servers is assigned to multiple clients,
wherein the first weighted-quantity and the second weighted-quantity are determined based upon at least the number of servers in the plurality of servers, and the number of clients in the plurality of clients,
wherein the load balancing computer processing system further comprises a control server, the control server is configured to determine the respective subset of servers and a proportion of processing requests to be sent to each server in the respective subset based upon information about other said clients, information about the plurality of servers, size of the respective subset of servers, and a unique identifier for the client,
wherein determining the respective subset of servers and the proportion of processing requests to be sent to each server in the respective subset comprises:
evenly dividing the plurality of servers into subsets of servers based upon the number of servers in the plurality of servers and the number of clients in the plurality of clients, and wherein determining the respective subset of servers and the proportion of processing requests to be sent to each server in the respective subset further comprises:
representing the plurality of servers in a continuous logical ring, with a respective slice of a first width in the ring representing each server;
evenly dividing the ring into sub-portions of a second width, a total number of the sub-portions being equal to the number of clients in the plurality of clients; and
determining the respective subset based upon a corresponding one of the sub-portions.

6. The load balancing computer processing system according to claim 5, wherein the one or more of the servers comprise a majority of servers in the respective subset of servers.

7. The load balancing computer processing system according to claim 5, wherein the first weighted-quantity and the second weighted-quantity are determined based also upon the size of the respective subset of servers.

8. The load balancing computer processing system according to claim 5, wherein at least one client in the plurality of clients is configured to transmit the second weighted-quantity of processing requests to a first one of the other servers in the respective subset and to transmit a third weighted-quantity of processing requests to a second one of the other servers, the second and third weighted-quantities each being a fraction of the first weighted-quantity.

9. The load balancing computer processing system according to claim 5, wherein at least one of said respective subset of servers having a different number of servers than others of the respective subset of servers.

10. The load balancing computer processing system according to claim 5, wherein said each client is further configured to determine, independently of other said clients, the respective subset of servers, and a proportion of processing requests to be sent to each server in the respective subset based upon information about other said clients, information about the plurality of servers, size of the respective subset of servers, and a unique identifier for the client.

11. The load balancing computer processing system according to claim 5, wherein each server in the plurality of servers is configured to be homogeneous with respect to other servers in the plurality of servers.

12. The load balancing computer processing system according to claim 5, further comprising the plurality of servers, each server being configured to receive processing requests from at least one of the clients, and at least one of the servers being configured to receive first and second amounts of the processing requests from two clients, a total sum of the first and second amounts of the processing requests being equal to the first weighted-quantity of the processing requests.

13. The load balancing computer processing system according to claim 5, wherein said each client receives the processing requests from a plurality of other devices.

14. The load balancing computer processing system according to claim 5, wherein the first weighted-quantity is uniform among all clients in the plurality of clients, and wherein the second weighted-quantity is non-uniform among at least some of the clients in the plurality of clients.

15. The load balancing computer processing system according to claim 5, wherein a first client in the plurality of clients is configured to transmit the second weighted-quantity of the respectively corresponding processing requests to a first one of the servers, and a second client of the plurality of clients is configured to transmit the second weighted-quantity of the respectively corresponding processing requests to the first one of the servers and a second one of the servers.

16. The load balancing computer processing system according to claim 5, wherein each of the servers is configured as a HTTP backend server and each of the clients is configured as a HTTP proxy.

17. The load balancing computer processing system according to claim 5, wherein determining the respective subset of servers and the proportion of processing requests to be sent to each server in the respective subset comprises:
- determining the number of clients in the plurality of clients, the number of the servers in the plurality of servers, a specified subset size, and a respective identifier for each client in the plurality of clients;
- assigning, to each client in the plurality of clients, the respective subset of servers selected from the plurality of servers, wherein the respective subset has a size corresponding to the specified subset size; and
- for each client in the plurality of clients, determining the proportion of processing requests to be sent to each server in the respective subset based upon projected use of each server in the respective subset of servers assigned to the client.

18. The load balancing computer processing system according to claim 5, wherein each client in the plurality of clients is configured to establish a communication connection to each server in a corresponding subset of servers, and wherein at least one server in the plurality of servers is replaceable or removable without causing at least one of the clients to re-establish previously established connections to servers in a corresponding subset of servers.

19. A non-transitory computer readable storage medium storing computer program instructions that, when executed by at least one processor of a client in a computer processing system, causes the client to balance load distributed over a communication network among a plurality of servers, comprising:
- determining a total number of the plurality of servers as a server set size, a total number of a plurality of clients as a client set size, an unique identifier assigned to the client, and a subset size for the client, the subset size being a total number of servers to be connected with the client; and
- based upon the determined server set size, client set size, subset size, and identifier assigned to the client, determining a subset of servers from the plurality of servers, and relative load weights for servers in the selected subset, so that a same volume of processing requests is distributed to the plurality of servers by the client as other clients in the plurality of clients, each of the relative load weights indicating relative amounts of processing requests transmitted from the client to respective server in the subset, and the selected subset having a size of at least the determined subset size and of a same size as respective subsets of selected by each other client in the plurality of clients,
- wherein at least one of the relative load weights for one server in the selected subset is a fraction of another of the relative load weights for another server in the selected subset, and
- wherein determining the subset of servers and the relative load weights for servers in the selected subset comprises:
- representing the plurality of servers in a continuous logical ring, with a respective slice of a first width in the ring representing each server;
- evenly dividing the ring into sub-portions of a second width, a total number of the sub-portions being equal to the number of clients in the plurality of clients; and
- determining the respective subset based upon a corresponding one of the sub-portions.

* * * * *